US009280773B1

(12) United States Patent
Evans et al.

(10) Patent No.: US 9,280,773 B1
(45) Date of Patent: Mar. 8, 2016

(54) SYSTEM AND METHOD FOR MANAGING FIRST PARTY RIGHTS TO CONTENT CAPTURED BY THIRD PARTIES

(75) Inventors: Gregory Morgan Evans, Raleigh, NC (US); James Evans, Apex, NC (US); Thomas Roberts, Fuquay-Varina, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2981 days.

(21) Appl. No.: 11/512,576

(22) Filed: Aug. 30, 2006

(51) Int. Cl.
*G06F 21/00* (2013.01)
*G06Q 20/40* (2012.01)

(52) U.S. Cl.
CPC .................................. *G06Q 20/4014* (2013.01)

(58) Field of Classification Search
CPC ................................................. G06Q 2220/18
USPC ............................................................ 705/59
See application file for complete search history.

(56) References Cited

U.S. PATENT DOCUMENTS

| | | | |
|---|---|---|---|
| 5,613,004 A | 3/1997 | Cooperman et al. | |
| 5,687,236 A | 11/1997 | Moskowitz et al. | |
| 5,862,217 A * | 1/1999 | Steinberg et al. | 713/176 |
| 5,862,218 A | 1/1999 | Steinburg | |
| 6,532,039 B2 | 3/2003 | Anderson | |
| 6,577,336 B2 | 6/2003 | Safai | |
| 6,816,596 B1 | 11/2004 | Peinado et al. | |
| 6,914,626 B2 | 7/2005 | Squibbs | |
| 6,963,363 B1 | 11/2005 | Ohmura | |
| 6,975,746 B2 | 12/2005 | Davis et al. | |
| 6,987,862 B2 | 1/2006 | Rhoads | |
| 7,003,132 B2 | 2/2006 | Rhoads | |
| 7,024,393 B1 | 4/2006 | Peinado et al. | |
| 7,043,048 B1 | 5/2006 | Ellingson | |
| 7,050,603 B2 | 5/2006 | Rhoads et al. | |
| 7,084,903 B2 | 8/2006 | Narayanaswami et al. | |
| 2002/0093567 A1 | 7/2002 | Cromer et al. | |
| 2002/0093573 A1 | 7/2002 | Cromer et al. | |
| 2003/0008662 A1 | 1/2003 | Stern et al. | |
| 2003/0112346 A1 | 6/2003 | Owlett et al. | |
| 2003/0122950 A1 | 7/2003 | Anderson | |
| 2003/0195855 A1 | 10/2003 | Parks et al. | |
| 2003/0223614 A1 | 12/2003 | Robins et al. | |
| 2004/0021669 A1 | 2/2004 | Fredlund et al. | |
| 2004/0098601 A1 * | 5/2004 | Epstein | 713/193 |
| 2004/0125982 A1 | 7/2004 | Kacker et al. | |
| 2004/0158712 A1 * | 8/2004 | Lee et al. | 713/165 |
| 2005/0073725 A1 | 4/2005 | Lim | |
| 2005/0226461 A1 | 10/2005 | Goldberg et al. | |
| 2005/0280723 A1 | 12/2005 | Ohmura | |

(Continued)

*Primary Examiner* — Charles C Agwumezie
(74) *Attorney, Agent, or Firm* — Withrow & Terranova, PLLC

(57) ABSTRACT

A DRM compliance system can include one or more DRM servers, capture devices capable of continuously encrypting content at capture, and one or more rights compliance software applications. Methods of ensuring DRM compliance can include registering and verifying capture devices prior to the presentation of protectable content. Unique IDs associated with the capture devices may be stored as DRM liens in a DRM server along with particular time periods an identified DRM policy is in effect. The rights compliance software application can consult a DRM server to determine if encrypted content captured by a device is subject to a DRM policy. The server can make such a determination based on attempting to match data identifying the capture device and time of capture to one or more DRM liens. When matches are found, applicable DRM policies are applied by decrypting the content and then rendering the content in a DRM-compatible form.

4 Claims, 13 Drawing Sheets

(56) References Cited

U.S. PATENT DOCUMENTS

| | | |
|---|---|---|
| 2005/0286736 A1 | 12/2005 | Rhoads |
| 2006/0029296 A1 | 2/2006 | King et al. |
| 2006/0125930 A1 | 6/2006 | Mindrum et al. |
| 2006/0136339 A1 | 6/2006 | Kim et al. |
| 2006/0184454 A1* | 8/2006 | Ananda .......................... 705/57 |
| 2006/0227640 A1 | 10/2006 | Herschaft et al. |
| 2006/0280246 A1* | 12/2006 | Alattar et al. ............ 375/240.15 |
| 2007/0129012 A1 | 6/2007 | Snow |
| 2007/0189333 A1 | 8/2007 | Naaman et al. |
| 2007/0220575 A1* | 9/2007 | Cooper et al. ................. 725/118 |
| 2008/0037826 A1 | 2/2008 | Sundstrom et al. |
| 2008/0052026 A1 | 2/2008 | Amidon et al. |

\* cited by examiner

SYSTEM AND METHOD FOR MANAGING FIRST PARTY RIGHTS TO CONTENT CAPTURED BY THIRD PARTIES

FIELD OF THE INVENTION

Aspects of the presently disclosed technology generally pertain to the control of digital rights management (DRM) for captured digital media, including video, photo, and audio content. More particularly, features and steps are provided to enable a controlling entity such as a venue, performer, rights manager, etc. to control rights to digital media that was captured in conjunction with an event by one or more third parties, such as event attendees.

BACKGROUND OF THE INVENTION

Copyright laws protect original expressions including performances captured in audio and/or visual form. Digital technologies such as computers and the internet have introduced a myriad of challenges to rights holders, since the use of such technologies allows for exact copies of media to be made without degradation. For instance, theoretically, an image obtained using a capture device such as a digital still camera or digital video camera may be copied an infinite number of times by a theoretically infinite number of persons. If any such copying is unauthorized, rights holders may have legal recourse, but may face tremendous difficulty in tracing and proving the extent of such unauthorized copying. Furthermore, perfect-quality copies may become so widespread as to impair the value of the original content.

The proliferation of digital technology also affects rights holders with respect to live performances. For instance, the ever-increasing ubiquity of digital cameras creates a point of conflict for rights holders, such as performers or venue management authorities. Specifically, concert goers are accustomed to taking digital photographs of themselves and their surroundings using digital cameras and the like. However, in a concert setting, such cameras could be used to capture content which is owned by, e.g., the performer. Therefore, generally speaking, most venues and performers prohibit attendees at a performance from even bringing a content capture device such as a digital camera into the venue. Even if the venue or performer wished to grant the attendee a limited right to use his capture device, due to the innate nature of digital content, the venue or performer would have no guarantee that the attendees would honor any such limits.

In response to the challenges posed by the proliferation of digital content capture and management devices, various digital rights management (DRM) schemes and techniques have been developed. For example, different DRM implementations include, but are not limited to, Microsoft Windows Media DRM, Open Mobile Alliance DRM, Open MG (Sony), Fair Play (i.e. Apple iTunes), and the MPEG 21 rights expression language and rights data dictionary. These and other DRM implementations may be used to render content in a DRM-compatible format.

Generally speaking, content in a DRM-compatible format is encrypted or otherwise encoded so that the content may not be freely accessed and copied. For instance, a DRM implementation may provide for degraded content access or no access at all unless a separate record of digital rights is available/verified. For example, a DRM-compatible playback or viewing application may query a license database to determine whether a particular file may be accessed. If so, the license database may provide a key for the viewing application to decrypt and play the file. If the DRM-compatible file is moved to an unauthorized computer, an attempt to access the file will fail if a license does not extend to the second computer.

However, a DRM implementation is of little value if the content is available in non-protected form. For instance, although a performer or concert promoter could apply DRM to its own still images from a concert, unprotected still images would still be available from attendees who used digital capture devices at the event. Therefore, there remains a need for the performer, concert promoter, venue, or other rights holder to be able to implement a DRM policy or DRM policies with regard to content that is captured by third parties unaffiliated with the rights holder, such as concert attendees.

SUMMARY OF THE INVENTION

Objects and advantages of the invention will be set forth in part in the following description, or may be obvious from the description, or may be learned through practice of the invention.

In one exemplary embodiment of the subject technology, a method for ensuring compliance with a digital rights management (DRM) policy can include registering at least one capture device prior to the presentation of protectable content, including obtaining identification data associated with the device. The device may comprise, for example, a digital still camera, a digital video camera, or another device, such as a cameraphone, that has the ability to capture content in digital form and to encrypt that content at the time of capture. Other devices, such as audio capture devices, are suitable as well. The method may further include providing a DRM policy associated with protectable content, such as specifying what type of DRM implementation should be applied to any content captured and what rights, if any, are associated with the content. After the content has been captured, it may be decrypted and then converted into a DRM-compatible form as specified in the DRM policy. The decryption and converting may be performed using one or more computer software applications or components configured such that files containing the content in an unprotected form are never fully accessible. Registering may include verifying that the capture device user agrees with a copyright policy covering the content, with the copyright policy presented to the person registering the device in a human-readable form. A record of such agreement may be stored and associated with the data identifying the device.

The method may also comprise verifying the integrity of the device after content has been captured by the device. For example, the date and time of the device may be checked for accuracy after a concert or other performance at a venue. A capture counter on a device noting how much content has been captured by the device may be verified after the content has been captured to ensure that the device has not been subjected to alteration or tampering.

The method may further comprise synchronizing the capture device with a capture device database. Synchronizing can include verifying the time accuracy of the device and verifying the encryption integrity of the device to ensure the device has not been tampered with. Furthermore, synchronizing can include verifying and/or updating device firmware to add or delete features or device functionality, such as substituting a new encryption key for a presently-existing encryption key stored on the device, for example.

Content decryption and conversion into a DRM-compatible form may be performed using computer software running on one or more computers interfaced with the capture device, such as a personal computer (PC) or other processing unit.

Alternatively, the content may be decrypted and converted into DRM-compatible form on the device itself.

A method of ensuring the protection of digital content can include accessing encrypted content and metadata associated with the content and querying at least one DRM database for a lien on the encrypted content. Querying can include sending information including data identifying the device and data identifying the times during which content was captured. Content for which at least one lien is received may be decrypted, and then a DRM policy applied based on what is specified in the lien, with the content ultimately stored in DRM-compatible form. The method can include decrypting and storing content for which no lien is received in an unencrypted form. For content covered by a lien, prior to decrypting of such content, the user may be presented with a DRM policy in human-readable form. The content may not be decrypted unless the DRM policy is acknowledged, and such acknowledgement may be stored and associated with the device identifier. If the policy is not acknowledged, the encrypted content may be deleted and not decrypted or may be held in encrypted form pending acknowledgement or expiration of the lien, for example.

A method of device registration in a DRM compliance system can include obtaining data from a capture device, the data including information uniquely identifying the device and indicating the internal date and time according to the device. Based on the identification information, the method may further include verifying that the device is compatible with a DRM compliance system. Verifying can include determining if the device is capable of encrypting content at the time the content is captured. Device registration may further include determining if the internal date and time maintained by the device is accurate within an acceptable tolerance. Finally, device registration may include adding information identifying the device to a DRM compliance database. The identifying information may be associated with at least one record indicating when a DRM policy is in effect for content captured by the device.

A system for ensuring third party compliance with digital rights management policies of content owners or other rights holders may comprise a plurality of content capture devices. Each device may have a unique identifier associated with it, and each device may be capable of encrypting content at the time of capture. The system may further comprise at least one DRM policy server, with the server configured to associate at least one particular device, at least one time interval, and at least one DRM policy with one another. The system may further comprise at least one rights compliance computer application configured to obtain data associated with content captured by a device. The obtained data can include data identifying the capture device and the time at which the content was captured. The computer application may be configured to access the at least one DRM policy server to obtain a DRM policy corresponding to the captured content and to render the captured content in a format compliant with DRM policy specified by the server. The system may include a DRM implementation server, with the DRM policy including data identifying the DRM implementation server, with the DRM implementation server providing data for use in rendering the captured content in a DRM-compliant format. For instance, the DRM implementation server may provide an encryption key specific to a DRM implementation for the computer application to use in rendering the content in a compliant format. The system may further include a capture device attribute server accessible by the computer application so that the computer application can obtain a decryption key suitable for decrypting content stored on or obtained from the capture device. For instance, the device attribute server may be maintained by a manufacturer or group of manufacturers to store device-specific decryption keys, with the keys accessible through presenting of the unique identifier for a device.

A method of implementing DRM policies can include obtaining data uniquely identifying at least one capture device, the capture device being capable of encrypting content at the time of capture. The method may further include storing DRM policy data associated with protectable content, and providing access to the DRM policy data in response to a query including data associated with a particular capture device and time interval data indicating when the content was captured by the device. The DRM policy data may include a DRM lien record for a particular device, the lien record specifying a DRM policy rights record setting forth a particular DRM implementation to be used and rights of one or more various parties. The DRM policy rights record and DRM lien record may be stored in one or more databases. The data uniquely identifying the capture device may be obtained prior to the entry of the device into a venue. The method may further comprise verifying the integrity of the device prior to allowing the device into the venue. Verifying the integrity can include ensuring the device is capable of encrypting content at the time of capture and ensuring that the date and time of the device are accurate. The integrity of the device may be again verified prior to the exit of the device from the venue. The data uniquely identifying the content capture device may be obtained in the process of providing a ticket to an attendee.

The content capture device may be configured to operate in a non-protected mode during which content is not encrypted, and in a protected mode, during which all content captured by the device is encrypted. The method may include directing the capture device to operate in the protected mode and may further comprise directing the capture device to operate in non-protected mode upon its exit from the venue. The capture device may be directed to operate in protected or non-protected mode by sending a wireless signal to the device. The device may be configured to operate continuously in protected mode. For situations involving devices operating continuously in protected mode, the policy lien or other records may include data indicating when content captured by the device at a venue is protected and when content captured by the device at the venue is unprotected.

The method may further comprise providing a DRM implementation application. The application may comprise computer readable instructions rendered in a computer readable medium, the instructions including code to direct a computing device to access metadata associated with an encrypted content file, the metadata including unique identification data for the device that captured the content and capture time data associated with the encrypted content. The application may be configured to access DRM policy data corresponding to the encrypted content by sending at least one query. The query can include data identifying the capture device and time interval data indicating when the content was captured. The application may be configured to decrypt the content and convert the content to a DRM-compatible form by applying a DRM policy based on the policy data.

The application may be configured to access a manufacturer database to obtain a device specific decryption key. The DRM implementation application may run on a capture device or on a computer interfaced to a capture device. The application may be configured to present a human-readable DRM policy prior to decrypting the content and store an acknowledgement of such DRM policy, either locally or remotely, and may further be configured not to decrypt any encrypted content for which the policy is not acknowledged.

BRIEF DESCRIPTION OF THE SEVERAL VIEWS OF THE DRAWINGS

A full and enabling disclosure, including the best mode of practicing the appended claims, directed to one of ordinary skill in the art, is set forth more particularly in the remainder of the specification, which makes reference to the appended figures, in which:

Use of like reference numerals in different features is intended to illustrate like or analogous components.

DETAILED DESCRIPTION OF THE PREFERRED EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the instant disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file from a second computer, the access may involve one or more intermediary computers, proxies, and the like. The actual file may move between the computers, or one computer may provide a pointer or metafile that the second computer uses to access the actual data from a computer other than the first computer, for instance.

The technology referenced herein also makes reference to the relay of communicated data over a network such as the internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein.

Figure 1A:
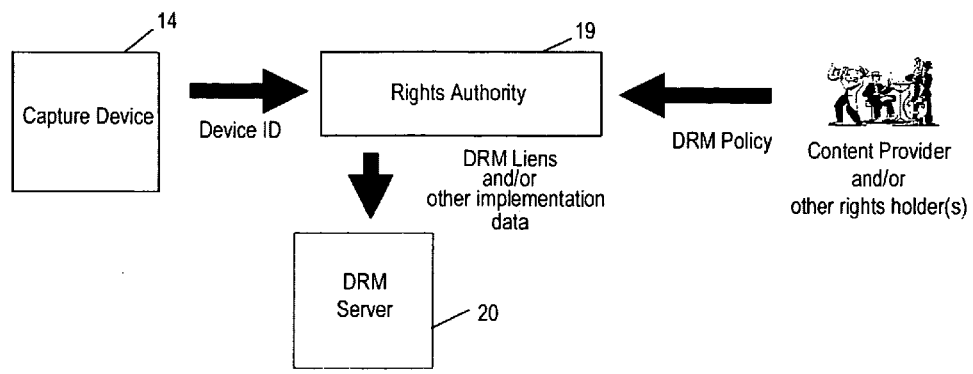
FIGS. 1A, 1B and 1C respectively depict an overall view of an exemplary digital rights management compliance system.
Figure 1B:
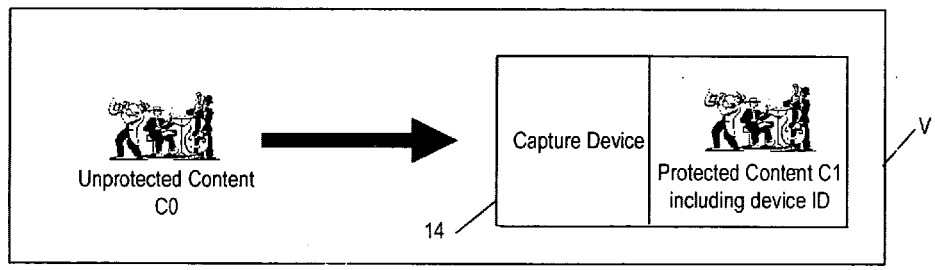
Figure 1C:
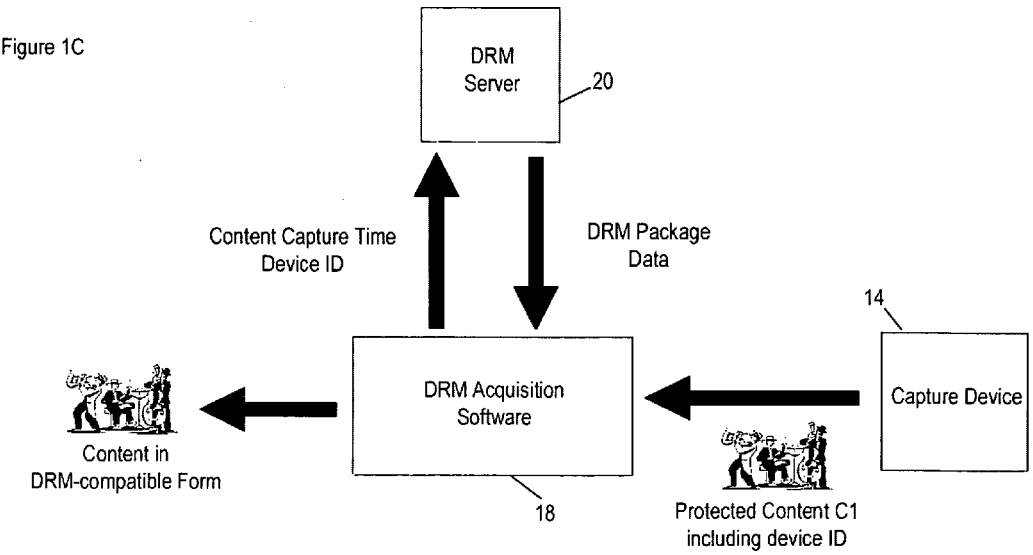

FIGS. 1A through 1C, respectively, depict aspects of an overall view of an exemplary digital rights management compliance system. One or more users may possess one or more capture devices 14, such as a camera. Capture device 14 is discussed in examples herein as being a still or video camera. However, one of ordinary skill in the art will appreciate that capture device 14 may encompass any suitable device capable of fixing content in a tangible medium. The content can include visual, audio, spatial, and any other physical phenomena that may be sensed and digitally recorded.

Using the technologies disclosed herein, the user may pre-register his camera or other device 14 with a rights management authority 19 as shown in FIG. 1A. For instance, the user may register his camera with an entity managing the venue or performer, the performer or his representative, or another rights management authority, such as a company hired to manage rights to content captured at performances. Of course, one of skill in the art will recognize that the identity of the rights management authority may vary depending upon contractual relations between performers, rights holders, venues, and the like.

Rights management authority 19 may implement one or more DRM servers 20 to track device IDs, DRM policies, and provide data for implementing DRM policies. For instance, rights management authority 19 may maintain a database of DRM liens (discussed below) specifying device IDs and time ranges for which a particular DRM policy is in effect. The liens may further include data which may be used by DRM acquisition software 18 in rendering the content in a DRM-compatible format, such as a DRM Encryption Key, license server URL, and venue information. The DRM servers 20 may furthermore be configured to interact with servers maintained by other entities, such as the entity responsible for implementing a particular DRM format, for example.

Registration includes the rights management authority 19 obtaining a unique identifier associated with capture device 14. As will be discussed in detail below, the unique identifier may include a device ID or other type of identifier. Also as shown in FIG. 1A, the rights management authority will also receive data defining DRM policy associated with content to be presented at venue V. The DRM policy can be associated with time interval data, such as a date and time period for during which content presented at venue V is subject to the policy. Accordingly, the user may register his device for an event to be presented at venue V and the unique device identifier will be associated in a computer database with the DRM policy specified for the content. One of skill in the art will note that, although in this example, the content provider (or other rights holder) is shown providing a DRM policy prior to a performance, this may not always be the case. For example, a rights holder may define a DRM policy after a performance is completed.

Capture device 14 preferably includes the capability to encrypt content or otherwise encode content at the time of capture. This encryption may be performed in any suitable fashion, provided that the device user is unable to decrypt or otherwise fully access protected content on his own. For instance, the device may have an encryption key specified by the manufacturer. At venue V, device 14 is checked to ensure that it complies with the DRM compliance systems and is operating in a protected mode in which encryption is applied as discussed above. As shown in FIG. 1B, the device user can than use device 14 to capture content at the venue and such content is stored in a protected form, including associating the content with the unique ID. For example, the user may be able to use a digital camera 14 to take still photographs of performers at the stage of a concert.

After content has been captured, the next overall phase in the rights compliance system is to convert the encrypted files into DRM-compatible files. This process, also referred to as transcoding to a DRM-compatible format, is generally performed by DRM acquisition software 18, and is depicted in FIG. 1C.

For example, device 14 may be interfaced to another computer, such as a PC running DRM acquisition software 18. Generally speaking, DRM acquisition software 18 obtains the encrypted media file from the capture device 14. The DRM acquisition software also obtains identification data associated with the protected files and date and time information indicating when the files were captured. For instance, the DRM acquisition software may obtain data stored by the device 14, or device data that is encoded in the content files themselves, for example.

DRM acquisition software 18 communicates with one or more DRM policy servers 20 maintained by the rights authority 19 (and other entities) to obtain digital rights management package data for use in rendering the content in a DRM-compatible form. For instance, DRM acquisition software may provide data identifying the capture device and the date and time range of the images. Based on device identification data and date and time data specified in conjunction with a DRM policy, the server(s) may return data for implementing the policy specified by the rights holder. For example, the DRM server(s) 20 may return an encryption key and license server data, such as a URL pointing to a suitable license server. The DRM acquisition software can decrypt the content obtained from the device 14 and then use the DRM package data, such as the DRM encryption key, to render the decrypted content in a DRM-compatible form.

DRM acquisition software 18 may run on a local computer interfaced to capture device 14 or on a remote computer accessed by the local computer to which the capture device 14 is interfaced. For example, content could be downloaded from device 14 to a device user's PC and then sent by the PC to a server running DRM acquisition software 18, which could then return the content in a DRM-compatible form. Alternatively, if device 14 is network-capable, device 14 could provide the content to such a server. In a still further alternative, DRM acquisition software 18 may run on capture device 14, provided capture device 14 is outfitted with a communications interface capable of accessing DRM policy server(s) 20 in order to obtain information to render content in a DRM-compatible format.

FIG. 1A illustrates a single rights authority 19 and a DRM Server 20. However, it will be apparent to one of ordinary skill in the art that the various servers and databases may be maintained by a number of different authorities working in combination with one another. For example, a rights management authority may define DRM policies, while a rights compliance company may handle device registration and verification, with a third party, such as a content management company, providing the framework and components to support the actual DRM implementation (i.e. license servers, content encryption keys, payment validation, etc.). One of skill in the art will appreciate that rights authority 19 may comprise a single entity or combinations of entities.

The DRM compliance systems herein are not dependent upon the particular hardware, software, or other implementations of capture device features, so long as the capture device: (1) is capable of encrypting or otherwise encoding content at the time of capture; (2) maintains data which can be used to differentiate content captured by the device; and (3) maintains data uniquely identifying the device in a manner that such identification data may be accessed. Although, as discussed herein, content is differentiated on the basis of time of capture and/or a content counter maintained by the device, other ways of uniquely identifying content may be utilized.

Figure 2:
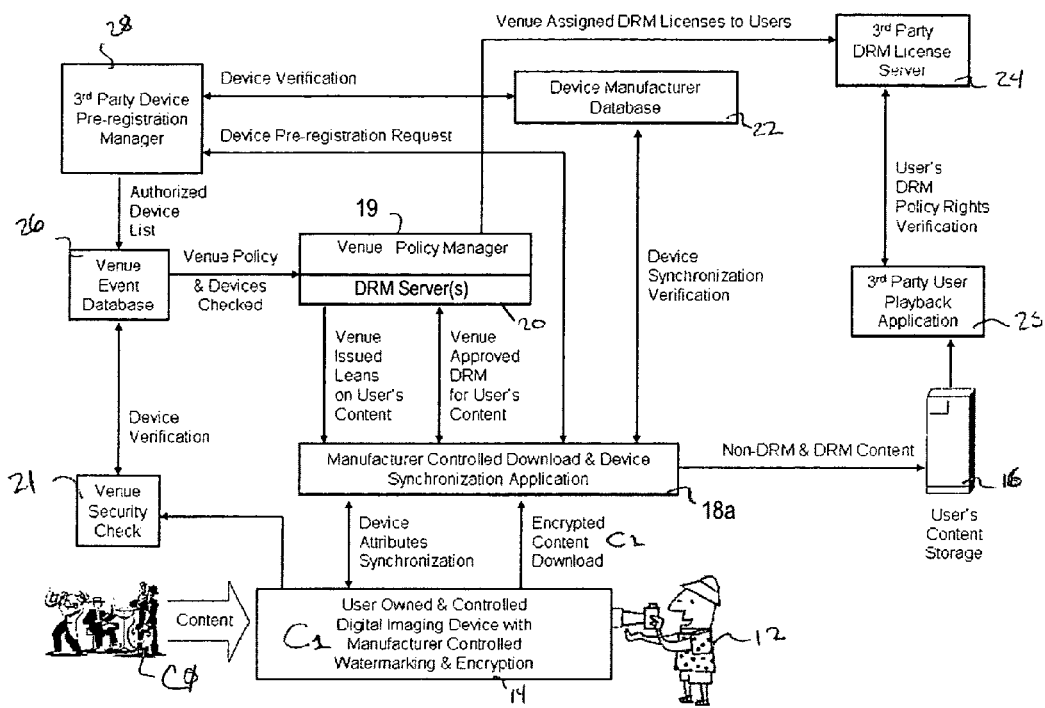
FIG. 2 provides a block diagram representation of exemplary system hardware components in a DRM compliance system.

FIG. 2 provides a block diagram depicting exemplary components functioning together to form a DRM compliance system. User 12 uses device 14 to capture content C. For purposes of clarity, content C is denoted with a subscript zero ($_0$) to denote live or unprotected content (i.e., content in a "raw" data format, such as MPEG or JPEG). Device 14 is configurable to continuously encrypt content $C_0$ at capture such that it is stored on device 14 as an encrypted file. Encrypted content is denoted as $C_1$ for ease of reference.

Device 14 may furthermore include watermarking capability to insert one or more watermarks into content, as well as encrypting the content. Device 14 may be interfaced to a manufacturer controlled download and device synchronization application 18a. Such an application may include a module corresponding to DRM acquisition software 18. However, synchronization and DRM transcoding may be handled by separate applications, of course. The device synchronization application may be configured to interface with one or more DRM servers 20 maintained by third-party venue policy manager 19, whose task may include ensuring compliance with DRM policies.

The venue policy manager 19 can define DRM liens on applicable content through reference to DRM policy data stored and associated with particular devices. The DRM liens may specify particular device IDs and particular time ranges during which the liens are applicable. The devices and time intervals may be associated with an event identification number that links to a DRM policy specified by the rights holder (s) to the event. For example, policy manager 19 may also maintain a venue event database 26 which stores lists of events with identifiers and associated copyright and DRM policies (or links thereto). The DRM liens may thus reference an event whose specific policy data is stored in the venue event database 26. The DRM liens may be returned in response to the implementation application and direct the application in converting content to a DRM-compatible format.

Information identifying the devices may be obtained by the device pre-registration manager 28 and/or venue security check 21. In addition to obtaining information identifying the device, registration may include verifying that the device is capable of continuous encryption, as well as accurate time keeping functionality, and whether the device has been fully updated such as with the most current device firmware. For instance, as part of the security check or pre-registration, device manufacturer database 22 may be consulted. Manufacturer database 22 may include a record indicating the last time a particular device was updated, for example, with new firmware.

The pre-registration manager 28 and venue security check 21 may be implemented using appropriately configured computer applications and databases. For instance, the pre-registration manager may be implemented using a server-side application that presents a graphical user interface and also interacts with the device through an appropriate connection, such as through a web-based application including device access controls. The venue security check may utilize appropriate hardware to interface with capture devices to collect data, and to also interface with one or more servers storing device attribute data (such as device IDs) and further configured to query appropriate sources to determine device compliance. For example, the servers may be configured to access the time reference and manufacturer databases used to determine device compliance.

Ensuring that the device is properly updated may be advantageous in that it provides assurance that the device's encryption capability and overall security is up to date. For example, if a device encryption key has been "cracked" (i.e., the security or integrity of the key's functionality has been jeopardized) the device manufacturer may issue an update including a new key and possible alterations to other programming in the device to avoid future "cracks." Verifying the time accuracy of the device may be advantageous, since the decision as to whether or not to apply a DRM policy depends in part upon determining when content was captured. The device may be verified before, after, or both before and after the presentation of content at a venue. Verifying after content has been presented may be advantageous in preventing a user from bringing into a venue a seemingly-compliant device and then tampering with the device during the performance. Additionally, if a user leaves a performance before the performance is completed, a check-out process may advantageously reduce the possibility that non-protected content captured by the user during the remaining time of the performance is not erroneously subject to a DRM lien.

As noted above, venue policy manager 19 may provide DRM liens on particular content based on the identity of the device and when content was captured. Application 18*a* may be configured to then decrypt content files, for example, by obtaining a decryption key from manufacturer database 22. For files for which a lien is in effect, application 18*a* may access a DRM license server 24 to obtain components used to render the content in a DRM-compatible format. For example, a DRM format may specify an encryption scheme utilizing a DRM-implementation-specific encryption key. Furthermore, the DRM-compatible file may require an identification of a license server 24 to access upon playback. For instance, DRM playback application 25 may read a DRM-compliant file to determine the identity and/or location of a license server 24, which application 25 checks to determine whether the application 25 is permitted to play the DRM-compatible file.

Figure 3:
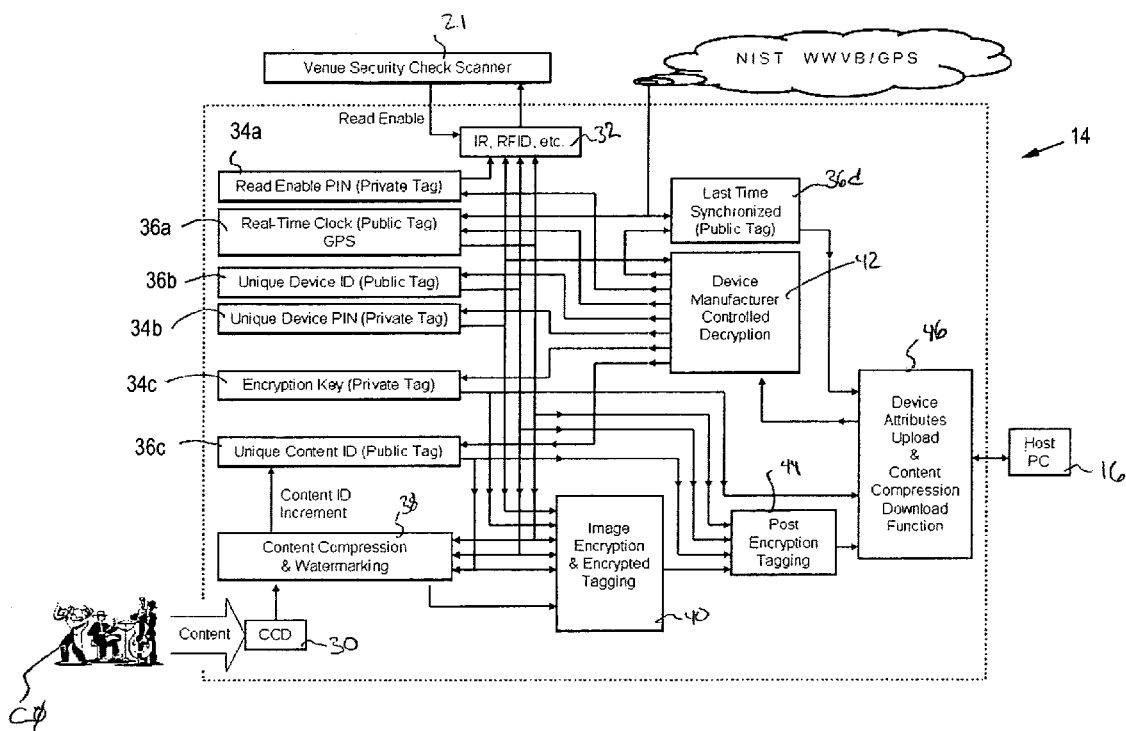
FIG. 3 depicts an exemplary functional layout of a capture device.

FIG. 3 depicts an exemplary functional layout of capture device 14. Content $C_0$ is captured, for example, by charge-coupled device (CCD) sensor 30 or other suitable sensors. The content is then optionally compressed and watermarked by routines generally denoted as 38, and then encrypted and tagged as indicated at 40. Device 14 maintains a plurality of public and private data tags, which may include information useful in implementing a DRM compliance system. As shown in FIG. 3, the device includes private tags 34A, 34B, 34C (collectively referred to as tags 34), which are all denoted as "private" tags, since such tags are not accessible to all parties. In some embodiments, the private tags may not even be accessed to the device user or owner. Tag 34A specifies a read enable pin. The read enable pin is used as a gatekeeping function to allow an authorized party to access the other private tags. Unique device pin 34B is a private tag or password that may be used by the device manufacturer or a third party to verify the authenticity of the device 14, as well as to uniquely identify the device. Encryption key 34C is used for content encryption by a device and decryption by the device download function. One of skill in the art will recognize that encryption key 34C is preferably kept secure from device end-users to avoid the possibility of circumvention.

Public tags 36A, 36B and 36C (collectively referred to as public tags 36) correspond to information that is readable by any party. This data includes the real time clock 36A which indicates the time maintained by the device 14, the unique device ID 36B, which is a identifier specific to the device 14, unique content ID 36C, which can be a counter that is incremented upon the capture of content or occurrence of some other predetermined event. For instance, content ID 36C could represent an ongoing count of the pictures taken using a digital camera. Last time synchronized tag 36D is a time stamp indicating when the device was last synchronized with a manufacturer database.

Device 14 further includes a communications interface 32 which may be used to access the various pins stored on the device. For example, a venue security check scanner 21 may use interface 32 to read the device's unique identifier and real time clock as part of the registration process or security check process.

Interface 32 may comprise any suitable type of port, or a combination of ports. For instance, interface 32 may provide for connectivity when the device is plugged into an IP appliance or other specialized hardware. Alternatively, the interface may support a standard connection, for example, a USB or IEEE 1394 port. The interface may support wireless connectivity, for example, by connections based on IEEE Standard 802.11, Bluetooth, infrared, or other suitable connection methodology. Interface 32 may comprise an RFID tag or interface which allows access to memory on device 14 via an RFID reader.

Device 14 further includes support for image (or other content) encryption and encrypted tagging 40, device manufacturer controlled decryption 42, post encryption tagging 44, and attribute and content compression and download functionality 46, which may be useful in interfacing with, for example, host PC 16. Encryption, decryption, tagging, compression, watermarking, and upload/download support may be implemented using any suitable combination of hardware and software within device 14.

For example, encryption may be a native feature of the capture device. However, the systems and methods disclosed herein are suitable for use with devices that are modified to include encryption of content with a unique identifier. For instance, a camera or other device that normally captures content in a non-encrypted form may be upgraded through addition of hardware and/or software modules so that it can capture content and encrypt the content at the time of capture.

As a further example, a camera or other capture device may use storage media, with the encryption, tagging, and other capabilities being implemented at least in part by processing and logic features of the storage media. The storage media could implement the security features (encryption, unique ID, PINs, watermarking, etc.) discussed in conjunction with capture device 14, which could allow for use of pre-existing capture devices including those originally lacking in implementation of the security features required for operation of aspects of the present technology. In such cases, the "device ID" would be unique to the storage media, and the actual capture device would preferably be configured to interface with the storage media so as to act as a conduit to relay the storage media ID during the registration process. Alternatively, the storage media could be accessed directly during the registration process.

Device 14 may maintain a clock linked to an outside source, such as a WWVB radio receiving from one of the National Institute of Standards and Technology (NIST) time signals, global positioning system (GPS) technology, or alternative clock synchronizing method. In one embodiment, the device could further utilize GPS, for example by including a tag indicating the device location, and associating the device location with content captured by the device, such as including GPS location tags with images. Any other suitable time base may be utilized by device 14, as well.

Figure 4:
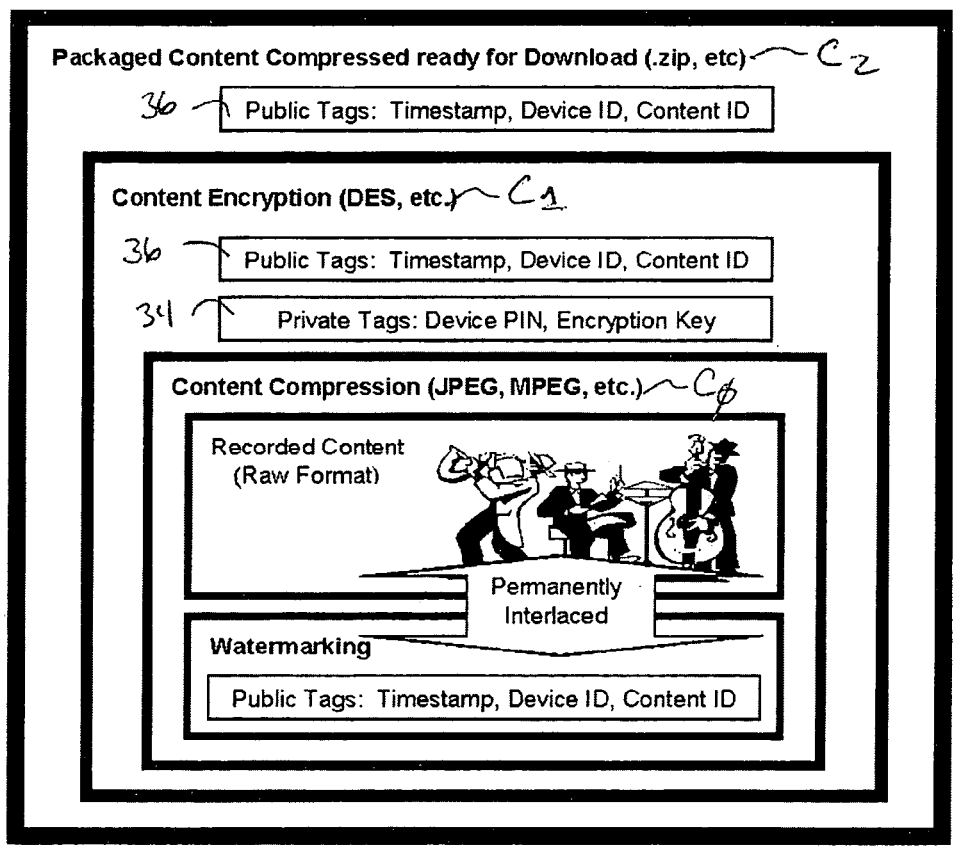
FIG. 4 provides an exemplary illustration of content encapsulation as downloaded from a capture device.

FIG. 4 illustrates content encapsulation as downloaded from the digital imaging device or other capture device 14. Raw content $C_0$ is stored in an unprotected data format, such as JPEG, MPEG, TIFF, or other suitable format. In the example of FIG. 4, the raw content is also interlaced with watermarking that includes public tags indicating the time the content was captured, the device ID, and the content capture ID. However, since capture device 14 may be configured to continuously encrypt content at the time of capture, raw content $C_0$ is encapsulated in an encrypted form denoted as $C_1$. Any suitable form of encryption may be used, such as AES, DES and the like. The raw content may be encrypted alongside private tags 34 and public tags 36, such as the device PIN, the encryption key, the time stamp, device ID, and content ID.

In FIG. 4, protected content $C_1$ is further encapsulated into packaged content $C_2$. For instance, the encrypted file may be losslessly compressed for easier transfer and download in a format such as .ZIP. As part of packaging the content, public tags 36 such as the time stamp, device ID, and content ID may be included in the package. Although public tags have been included in three different levels of encapsulation in FIG. 4, and a second level of encapsulation is depicted, a digital rights compliance system may use more or fewer levels of encapsulation, and include the tags in more or fewer places. At a minimum, an encrypted file may be non-watermarked, but may be associated with public tags identifying at least the device ID and the time of capture.

Figure 5:
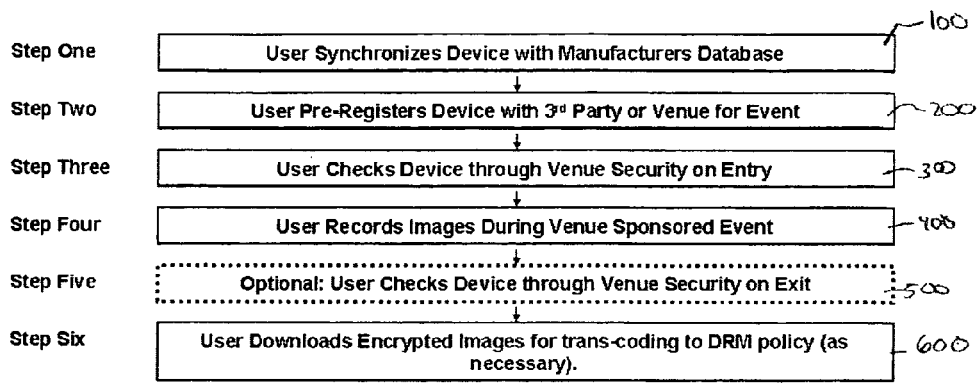
FIG. 5 provides a flowchart representation of exemplary steps in a method for ensuring DRM compliance.

FIG. 5 illustrates an overall flowchart for exemplary system usage. Each step shown in FIG. 5 will be discussed in more detail in conjunction with FIGS. 6-11, respectively. At step 100, a user synchronizes a device with a manufacturer or other device database. At step 200, the user pre-registers one or more devices with the content management authority, such as the rights policy manager 19 (see FIGS. 1A and 2). At step 300, the user checks the device through venue security upon entry to the venue. At step 400, the user records images (or captures other content) during an event. As noted above, the device is configured to continuously encrypt content during capture with a device-specific encryption key, so that files stored on the device are encrypted in such a manner that the user cannot freely and fully access the files.

For example, the files may not be accessible at all without the appropriate decryption key, or may be limited in quality or the number of allowed accesses without the encryption key. For instance, the files may be encrypted, but a low-resolution image may be available to the device user for identifying the file or deciding whether or not to seek authorization to use the full file. The device may be configured to decrypt its own files in order to display preview or full images, for example, but not to allow transfer of such decrypted files. Alternatively, the device may store an unencrypted, low-resolution (or other low-quality) preview version of the images (or other files), with the full-quality version encrypted.

At step 500, the user checks the device through venue security upon exit. This step may be omitted, if desired, but may provide additional safeguards for preventing capture of content using devices that have been subject to tampering or have malfunctioned. At step 600, encrypted content is downloaded from the user's device for transcoding to a DRM policy. Step 600 makes use of one or more DRM acquisition applications, which check for DRM liens on the content. Of course, for content for which no lien is applicable, the content is decrypted without further action.

Figure 6:
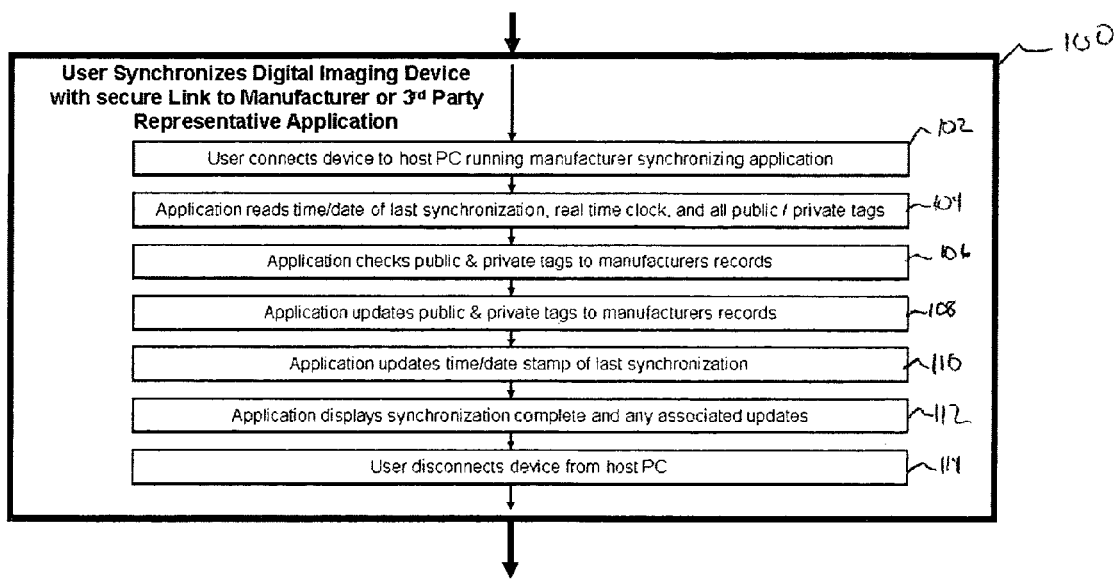
FIG. 6 provides a flowchart representation of exemplary steps in a process for synchronizing a capture device.

Turning now to FIG. 6, step 100 is discussed in more detail. At step 102, a user device is connected to a host PC or other computer running a synchronizing application. For instance, the synchronizing application may be provided by the device manufacturer. At step 104, the application reads the date and time of last synchronization, the present time, and all public and private tags stored on the device. The synchronization application may transmit the device PIN and read enable pin so as to allow full access to all tags stored on a device. The application checks at step 106 the public and private tags to a manufacturer's records, and at step 108 updates any public and private tags on the device so that the tags match manufacturer records. For instance, if the manufacturer has issued a new encryption key, the old encryption key on the device would be discarded and replaced by the new key. After synchronization is complete, at step 110 the application updates the time and date stamp of the last synchronization. At step 112 the application displays an indication that synchronization is complete, and at step 114 the device is disconnected from the PC or other computer.

Although a host PC is discussed as interfaced with the content capture device, the synchronization process may run on the device itself, provided that the device itself is network-capable. The device could be configured to access a remote computer over the network to supervise the device update process. For example, the device could contact an update server maintained by the manufacturer for periodic firmware updates, in a manner similar to live update services implemented for computer software and cell phone firmware updates.

Figure 7:
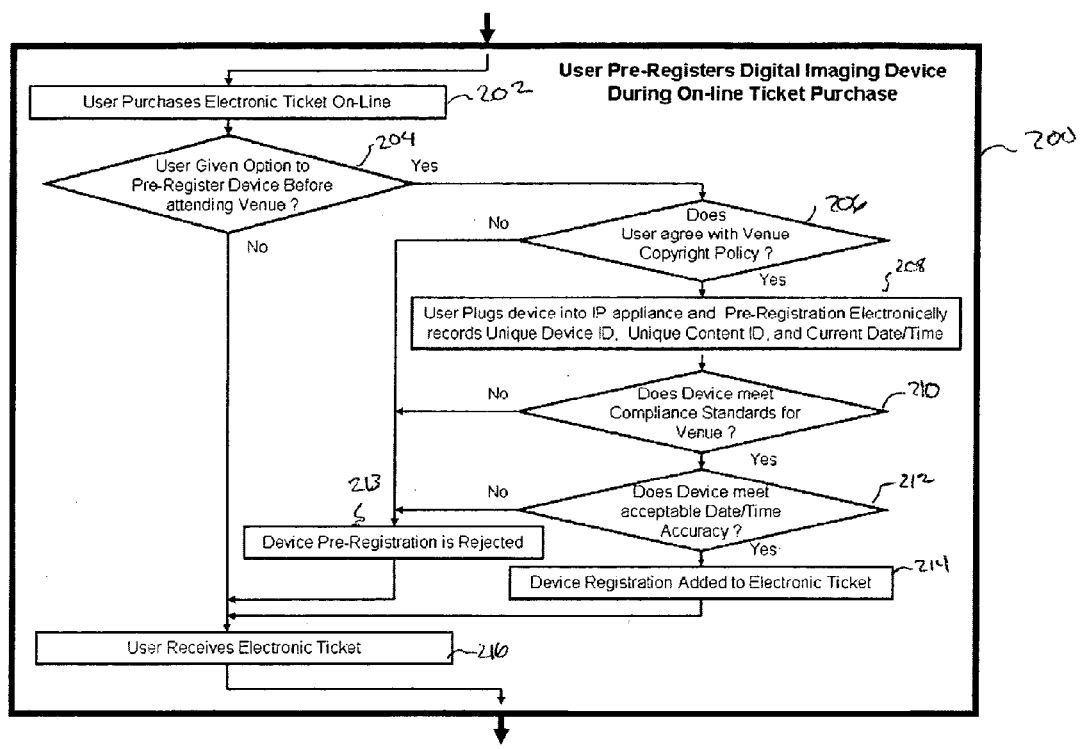
FIG. 7 provides a flowchart representation of exemplary steps in a process for pre-registering a capture device.

FIG. 7 shows pre-registration step 200 in further detail. In one embodiment, pre-registration may be part of purchasing an electronic ticket through an online service. For instance, as part of a ticket purchase process, at step 204, the user is given an option to pre-register one or more devices before attending the venue. If the user chooses not to, the electronic ticket process moves forward to step 216 without registration, with registration to take place at a later point. However, pre-registration may also be implemented as part of entry to a venue, after ticket purchase but before visiting the venue, such as via an online registration process, or at another point prior to the presentation of protectable content. If at step 204 the user chooses to register one or more devices, at step 206 the user is presented with a copyright policy. The copyright policy may be specified by the venue, a rights management entity, the performer, and the like in a human-readable form. If the user does not accept the copyright policy, device pre-registration is rejected at step 213. However, if at step 206 the user agrees with the copyright policy, at step 208 information about the device or devices the user wishes to register is obtained. One exemplary manner in which device information is obtained in step 208 involves plugging the device into an IP appliance so that the pre-registration application may electronically record data from the device. Alternatively, the user's device may be plugged into a computer to access the registration process, for example, via a USB or IEEE 1394 port. The information may be obtained wirelessly, for example, by connections based on IEEE Standard 802.11, Bluetooth, infrared, or other suitable connection between the device and the registration application.

Referring still to FIG. 7, the registration application verifies at step 210 that the device is compliant with the DRM compliance scheme. For instance, the date and time accuracy of the device's internal clock can be verified, the date and time of the last update to the device can be checked to ensure that the device programming is current, and the encryption capability of the device can be verified, for example, by checking a manufacturer database indicating encryption capability. If, at steps 210 and 212 the compliance standards and date and time accuracy are met, the device registration is added to the ticket at step 214. If the device somehow fails to meet compliance standards or data and time accuracy requirements, device pre-registration is rejected at step 213.

Figure 8:
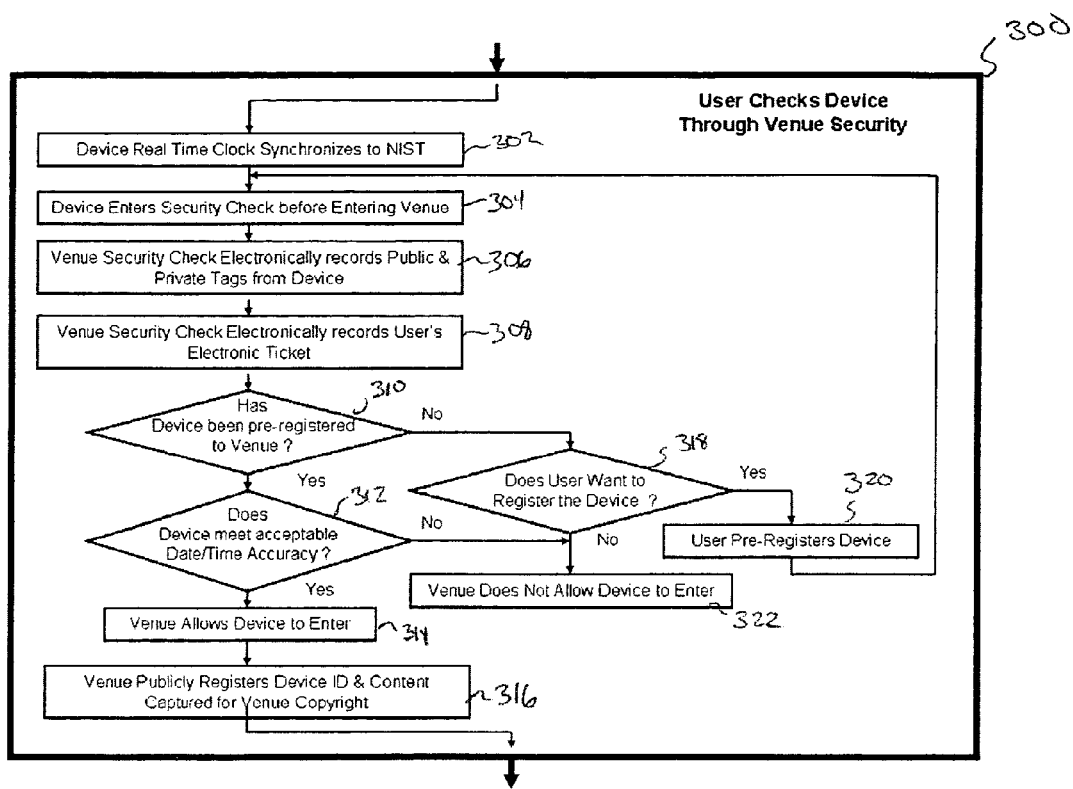
FIG. 8 provides a flowchart representation of exemplary steps in a process for checking a capture device through event security.

FIG. 8 provides exemplary detailed steps for implementing method step 300, corresponding to venue security check and device authentication. As noted above, the security check process may include registering devices that were not pre-registered at the time of ticket purchase or at another time prior to event attendance. At step 302 the device real time clock is shown as synchronizing to an external time source, such as the NIST time signals or others previously mentioned. However, one of ordinary skill in the art will appreciate that not all devices may be capable of such synchronization.

At step 304, the device is entered into the security checkpoint before entering the venue. For example, at the point where tickets are taken, a separate security line may be established, where venue or rights management personnel may be stationed along with appropriate computer equipment to read and evaluate devices, as well as verify tickets.

At step 306 the venue security check electronically reads the public and private tags from the device. For instance, as discussed above, the device may be accessed via any appropriate wireless technology, or may be plugged into a computer or other electronic device. At step 308, the security check also records the user's electronic ticket. At step 310, the device data is compared to data indicating which devices have been pre-registered. If the device has not been pre-registered, the user is asked at step 318 whether the user wishes to register the device. If not, step 322 indicates that the device is not allowed to enter the venue. However, if the user wishes to register the device, at step 320 the user is directed to the pre-registration process, such as the process set out in FIG. 7. For devices that have been pre-registered, at step 312 the date and time accuracy of the device is verified. The date and time accuracy may be determined based on comparing the real time clock of the device to a separate outside source, such as one maintained by the venue or rights compliance provider. The date and time accuracy must fall within a specified threshold. If so, the device is allowed to enter the venue at step 314. For devices that enter the venue, the device ID is registered at step 316 in one or more databases to associate the device ID with the event.

Figure 9:
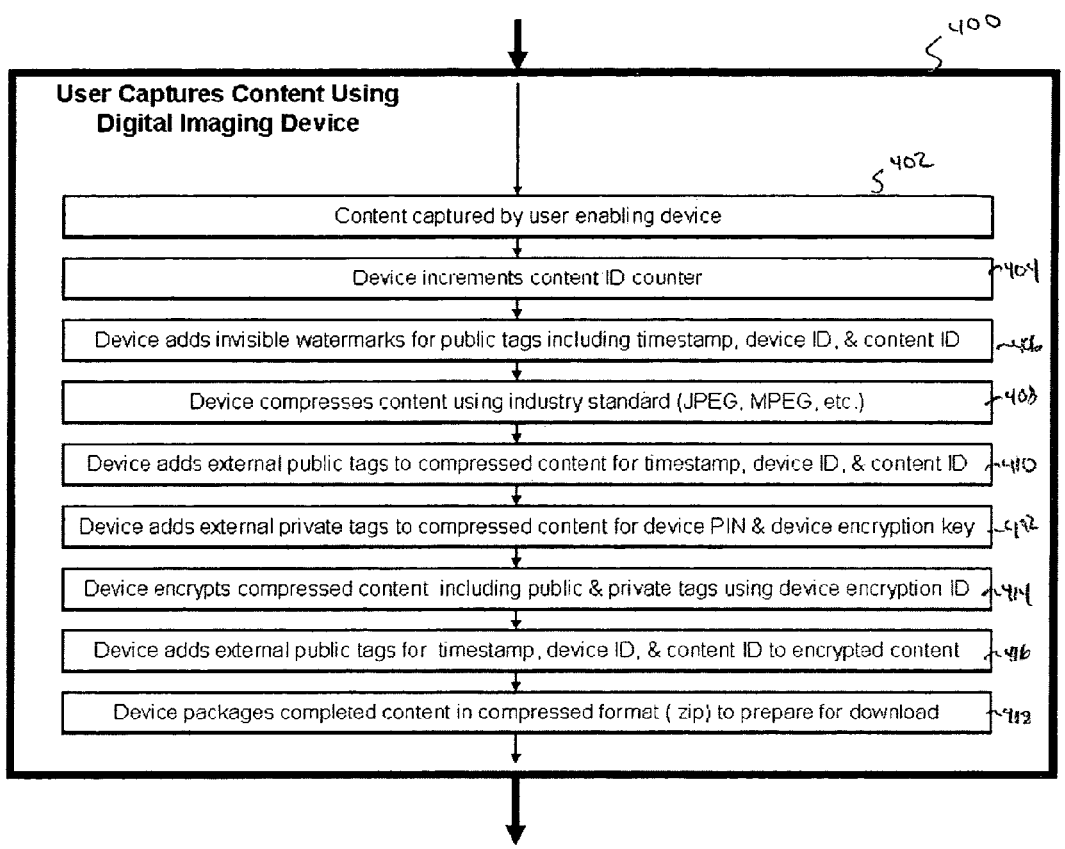
FIG. 9 provides a flowchart representation of exemplary steps in a process for capturing digital content using a capture device.

FIG. 9 shows a detailed flowchart of an exemplary content capture process during a performance. At step 402, the user enables the device, such as turning on the device or waking it from its sleep mode, for example, and taking a picture or recording a portion of video. At step 404, for each content capture event, the device increments its internal content ID counter. At step 406, the device adds watermarks for public tags, including time stamp, the device ID, and the content ID counter, for example. At step 408, the content is compressed or otherwise rendered in a standard format, such as but not limited to JPEG for images, MPEG for movies, or any other acceptable format. At step 410, external public tags are added to the compressed content indicating the time stamp, device ID, and content ID. At step 412, external private tags are added, such as the device PIN and device encryption key. At step 414 the device encrypts the compressed content, including the tags associated with the content, using the device encryption ID. At step 416 the device adds external public tags, including time stamp, device ID, and content ID, to the encrypted content. At step 418 the device packages the completed content in a lossless compressed format, such as .ZIP, for easier download and transfer.

As was discussed above in conjunction with the encapsulated content format, devices may be configured to add more or fewer public tags, as well as more or fewer levels of encapsulation. For instance, a device may be configured simply to continuously encrypt content with the device's encryption key, and then add an external public tag indicating the device ID and time of capture to the encrypted file. Other combinations and variations of encapsulation, watermarking, and addition of tags will be apparent to one of ordinary skill in the art.

Furthermore, a capture device may be configured to continuously encrypt all content at the time of capture, or to be selectively switched between a protected mode in which content is continuously encrypted and a non-protected mode during which content is not encrypted. For instance, communications interface 32 as discussed with reference to FIG. 3 may be used to activate/deactivate protected mode, or even to switch between still further modes of protection (for instance, stronger or weaker encryption, or even disabling all recording). For example, devices could be switched into protected mode upon entering a venue or a protected area within a venue, and switched to unprotected mode upon exit. Mode selection may be effected via any combination of wired or wireless signal(s).

Figure 10:
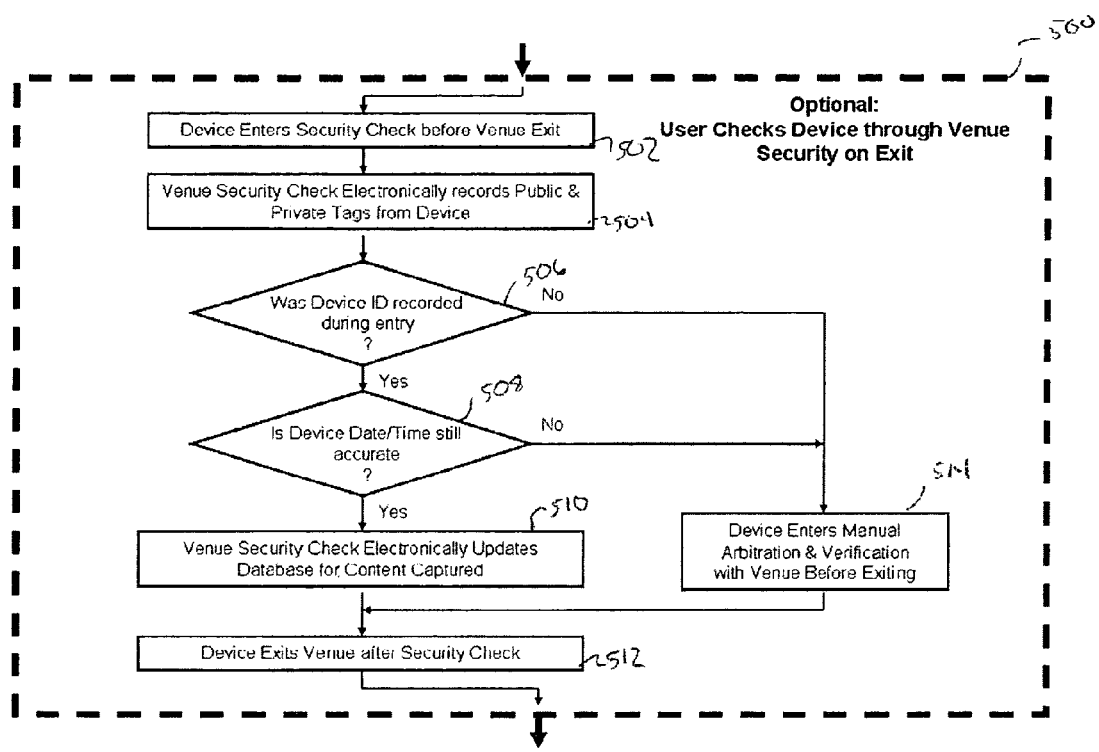
FIG. 10 provides a flowchart representation of exemplary steps in a sometimes optional process of checking a capture device through venue security upon exit of a venue event.

FIG. 10 shows a detailed flowchart of optional step 500 generally involving a method of checking a device through venue security again upon exit. At step 502, the device enters the security checkpoint. At step 504, the security checkpoint electronically notes the public and private tags from the device, in a manner similar as with the pre-performance checkpoint discussed with reference to FIG. 8. At step 506 the device ID is checked against those recorded during the entry phase. At 508, the date and time stamp of the device are checked to ensure that they are still accurate. If either of steps 506 and 508 show irregular results, the device enters manual arbitration and verification steps 514 before the device is allowed to exit the venue. For instance, if the device's time changes beyond an acceptable tolerance during the event, it may be an indication that the device was tampered with over the course of the event. If so, a download of the encrypted content may erroneously result in the content being decrypted without reference to a DRM lien due to the inaccurate date and time associated with the content. If a device ID is not recorded during entry, a DRM lien will not be associated with content captured by that device. Therefore, if either of these or other error conditions is found, the device may be provided to personnel for a more detailed inspection.

Referring still to FIG. 10, if there are no variances in steps 506 and 508, the security check electronically updates the database at step 510 indicating that content was captured by the device. In an embodiment where devices utilize a content counter, the database may include information indicating how much content was captured during the event based on the counter (for example, the number of still images taken and/or the amount of video obtained during the event). Afterwards, at step 512, the device exits the venue after the security checkpoint.

Although step 500 may be optional in the event a pre-performance security check 300 is performed, if step 300 is omitted, then step 500 is no longer optional. For instance, certain venues or performances may be more conducive to post-performance registration and verification of devices. For example, after an impromptu performance, devices may be checked at a security checkpoint, and any devices that recorded content during the time period of the performance would be added to the database. Of course, for such an embodiment to provide full protection, the download and decryption process would have to require a DRM lien for all content that is decrypted, and provide that content for which no DRM lien is available to be deleted. Such an arrangement may be suitable for use with devices that may be selectively switched into protected (i.e. encryption-enabled) mode, which would minimize the risk of un-protected content erroneously being indicated as subject to a DRM lien.

Figure 11:
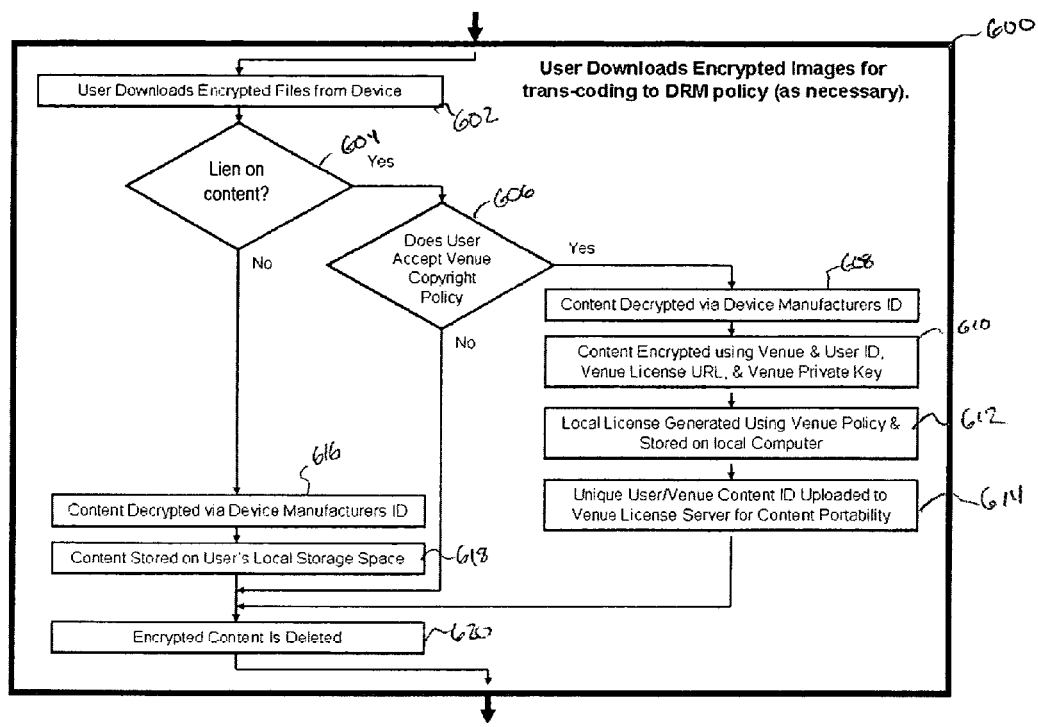
FIG. 11 provides a flowchart representation of exemplary steps in a process for downloading encrypted images for transcoding to a DRM policy.

FIG. 11 shows a detailed flowchart depicting steps in method step 600, by which a user downloads encrypted images for transcoding to a DRM policy. At step 602, the user downloads encrypted files from the device. The encrypted files may be downloaded directly from the device to a computer running the DRM compliance application or may be transferred from another device indirectly. For example, the user may download the encrypted files to one computer and then e-mail them to a second computer, with the second computer actually performing the decryption and transcoding steps. Alternatively, the capture device may be network-capable, and may be configured to decrypt and transcode content to a DRM policy.

At step 604, the DRM acquisition software checks to see if a DRM lien or liens is applicable to the content based on the device ID and time identification associated with the downloaded content. The device ID and data indicating when the content was captured may be obtained from reading the tags included in the compressed file package and/or the tags included in the encrypted file.

If such a lien is found, the user may be presented at step 606 with the copyright policy specified in the lien. For example, the lien or other data provided to the software may include a link to a copyright policy in human-readable form to be displayed in the manner of, for example, a click-wrap license. If the user agrees with the policy, the content is decrypted at step 608 using a decryption key corresponding to the device's encryption key. For instance, the device ID may be used to access a device database maintained by the device manufacturer, which may provide a decryption key in return.

At step 610, the decrypted content is encrypted again, this time in a manner as specified by the DRM lien. For example, the DRM lien may specify that the content is to be encoded in a format compatible with the Microsoft Windows Media DRM format. If so, the DRM lien will also include data that provides for the software to properly render the content in a Microsoft DRM-compatible format. For instance, at step 612, a license is generated for the decrypting computer, if applicable, and stored on the local computer. At step 614, the user or venue content ID is uploaded to the venue license server for recordkeeping, such as to allow for content portability. At step 620, the encrypted version of the content originally downloaded from the device is deleted.

If, at step 604, the software determines that there is no lien applicable to content, the content is decrypted using the device manufacturer's data and then stored at step 618 in any suitable non-DRM format. At step 606, if the user does not accept the venue copyright policy, the encrypted content may be deleted at step 620. However, alternatively, the encrypted content may be held, either indefinitely or for a set period of time pending acceptance of the policy. As a further alternative, the DRM lien may have a finite duration, with the encrypted content held pending the expiration of the lien.

Figure 12:
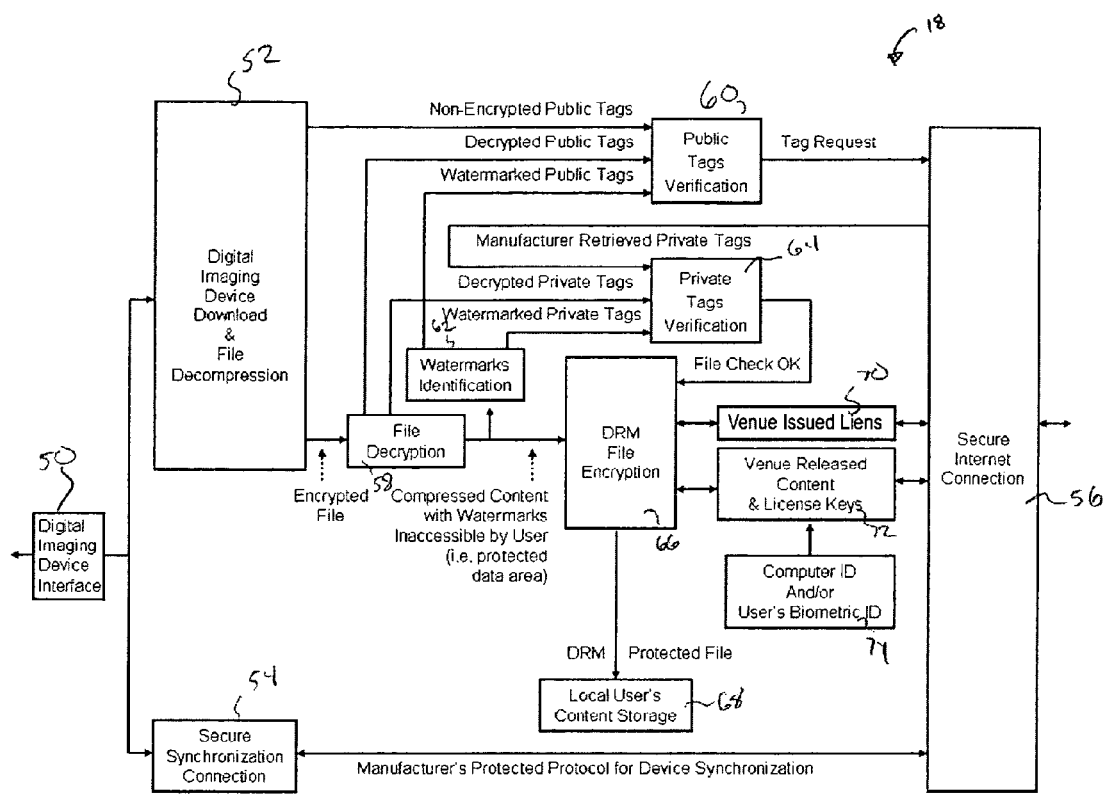
FIG. 12 shows a generalized functional block diagram of components and functionality that may be included in an exemplary DRM acquisition and transcoding application.

FIG. 12 shows a generalized functional block diagram of components and steps in the content download and transcoding process which may be implemented as part of the previously-discussed DRM acquisition software 18. For instance, one or more computer software applications may be used to access content from the digital imaging device and communicate with one or more servers to obtain the data needed to decrypt the files and then appropriately protect the files using a specified DRM implementation. The software may include appropriate interface routines indicated at block 50, for accessing the content stored on the device. As a preliminary step 54, the computer that is used to download and transcode the protected content is securely synchronized over a secure internet or other network connection 56 to one or more servers or other computers for sending and receiving DRM policy implementation data. As shown at module 52, the software is capable of downloading and decompressing files in formats supported by the device, for instance, using standards-compliant routines.

Servers and databases involved in the DRM compliance system may request public and private tags associated with the content. FIG. 12 indicates at 60 and 64 the capability of the transcoding software to provide the public and private tags, respectively. As shown in FIG. 12, the public tags may be obtained from non-encrypted public tags stored in the compressed file downloaded from the device. Public tags may also be obtained from the decrypted version of the encrypted file, as indicated at 58. After the file has been decrypted, the software may include functionality to identify via feature 62 any watermarks included in the content. The public tags included in the watermark may also be considered in the verification by feature 60.

The use of the tags at multiple levels of encapsulation allows for a further check on the authenticity and integrity of the DRM compliance capability of the device. For instance, if the public tags in the encrypted file do not match the public tags in the watermark and/or the tags included in the compressed version of the file, an error condition may be indicated based on the possibility of tampering.

Private tags may also be verified based on private tags included in the encrypted file and/or the watermark. An additional verification may be provided by checking the private tags associated with the content against the private tags associated with the device ID and provided over the secure internet connection via the manufacturer. One of skill in the art will appreciate that although at 58 the encrypted file is decrypted, the data comprising the content in its decrypted form is inaccessible by the user. At module 66, the decrypted content is encrypted using a DRM implementation specified by one or more servers and as set forth in DRM liens indicated at 70 received by the transcoding application. Based on information in the liens, the application may access content and license keys for use in the DRM encryption. 74 indicates that the encryption may also include associating the file with a computer and/or user biometric ID. For instance, if the computer operates using the trusted computing platform, the identifier for the computer may be included in DRM protected files stored at the local user storage 68.

Figure 13:
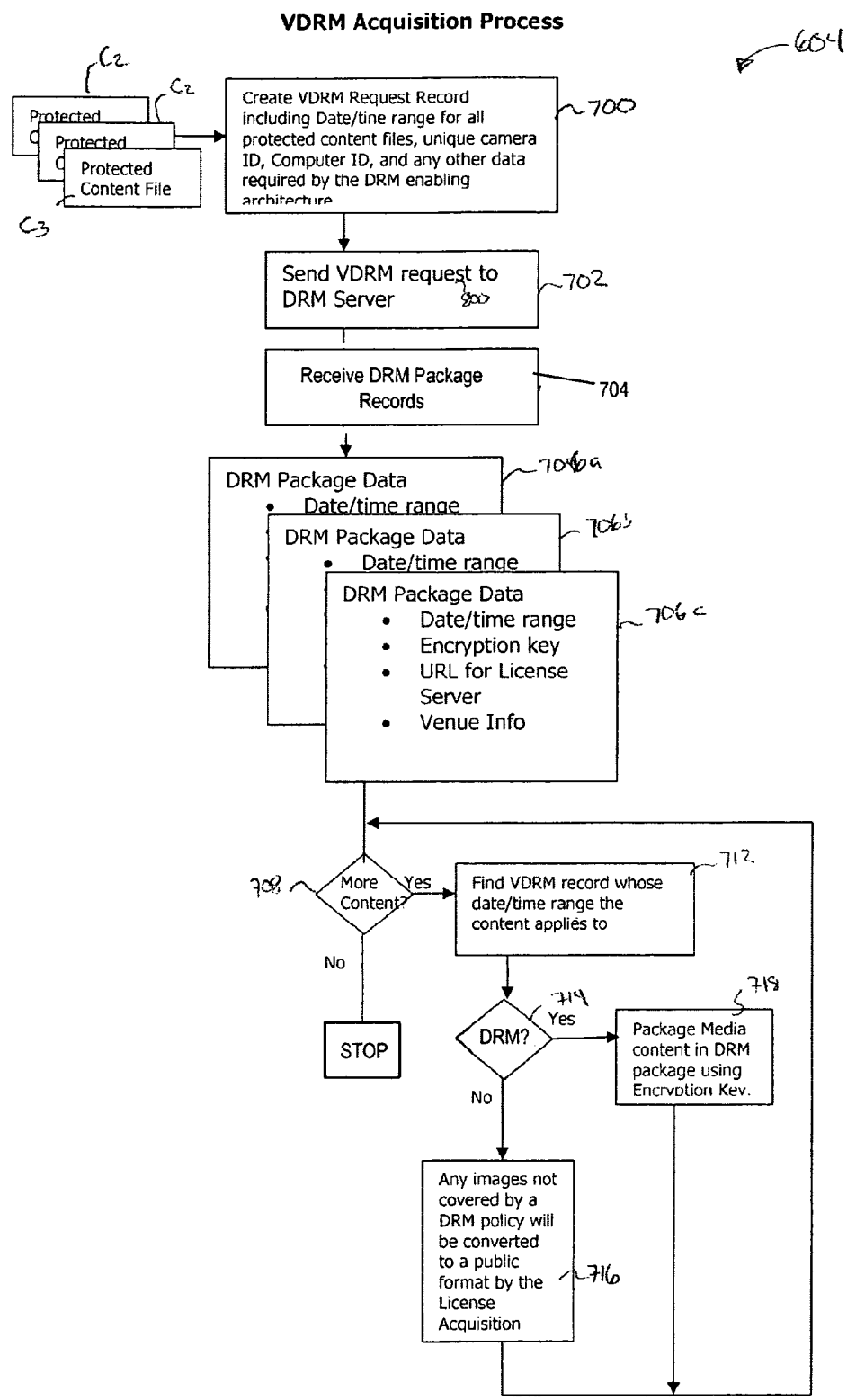
FIG. 13 provides a block diagram representation of an exemplary process through which a DRM acquisition and transcoding application may obtain data for implementing a DRM policy.

FIG. 13 depicts an exemplary process through which the transcoding application obtains data for implementing a DRM policy. As discussed above, at step 604, a computer application checks to see if a DRM lien is applicable to content that was captured and encrypted by a device, such as a digital camera. If such a lien is located, the content is decrypted and then re-encrypted according to the specific DRM policy. FIG. 13 discloses an example this process in more detail.

At initial steps 700 and 702, one or more protected content files are accessed and VDRM request records are generated. For instance, FIG. 13 shows three protected content files, two of which are encrypted content files denoted as $C_2$ and one of which is an encrypted content file that has been encapsulated and so therefore is denoted $C_3$. The DRM compliance application de-encapsulates and accesses tags associated with the content in any suitable manner to obtain the data and time range for each protected file, along with a unique identifier for the capture device that captured each protected file. Additional information may include an identifier of the computer which is doing the transcoding, and any other data required by the DRM architecture. For instance, if the DRM architecture utilizes the trusted computing platform, the DRM request record may include the identifier for the particular computer.

At step 702, the VDRM request is sent to one or more DRM servers. At step 704, assuming that a match is found, one or more DRM package data records 706 are received. FIG. 13 depicts three DRM package data records 706A, 706B, and 706C, corresponding to the three files. Each of these files, also referred to herein as policy rights records, may include an encryption key for re-encrypting the content, the date and time range of the content if needed by the DRM implementation, a URL for the license server, and information about the venue. Additional information required by the DRM architecture may also be included in the records. One of ordinary skill in the art will appreciate that the policy rights records may be received directly by the transcoding application upon sending a query, or indirectly in response to a query. For example, the transcoding application may provide data identifying content, including a device ID and time interval, to a first server. The first server may look up DRM lien(s) based on the information, and based on the returned lien(s), the first server may assemble appropriate DRM package records. Alternatively, the first server may return the DRM lien or data included therein to the transcoding application. Based on the data returned to the transcoding application, the application may access one or more additional servers which then provide the DRM package records.

Referring still to FIG. 13, step 708 represents an iterative check to see if there is more encrypted content. For example, step 708 may represent a FOR loop executed for each instance of a protected file. If there is a protected file which has not yet been evaluated for DRM compliance, the process continues at step 712 to see if there is a corresponding rights policy record to the date and time range associated with the content and with the device ID associated with the content. Step 714 represents a check to see if a DRM policy is applicable to the content in question; for example, if a policy rights record has been returned in response to a query.

For all content for which rights policy data was returned, the content is packaged at step 718 in a DRM package using the encryption key and other information so that the content is rendered in a DRM-compatible form. For content for which no DRM policy record is returned, at step 716, the content is converted to a public format, such as an unprotected JPEG or MPEG file, for example. The routine loops back to 708 until all protected content has been addressed, either through rendering in a DRM-compatible format, rendering in a nonprotected format, or otherwise addressed (for instance, deletion or holding for protected content for which no acknowledgement of the DRM policy is made).

Figure 14:
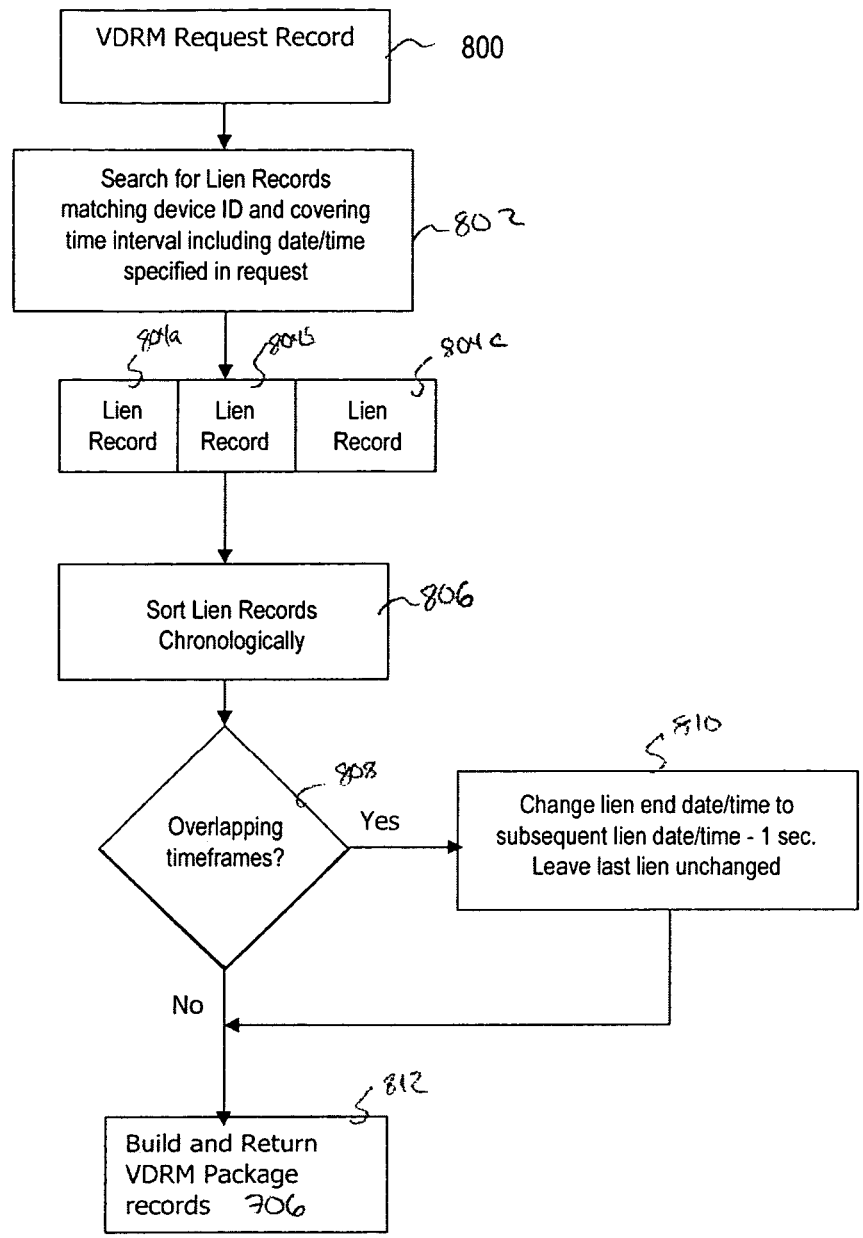
FIG. 14 illustrates exemplary steps performed by one or more servers associated with storing and providing DRM policy liens and DRM implementation data.

FIG. 14 illustrates exemplary steps performed by one or more servers associated with storing and providing DRM liens. At step 800, a server receives a DRM policy rights record request. At step 802, based on information included with the request, the DRM policy database is searched for lien records with matching device IDs and specified date and time ranges. For example, three encrypted video files from a concert may be downloaded from a digital video camera, with each file including data identifying the camera and the time the file was captured. A DRM compliance application may develop a query including the device ID and time intervals and make a request for rights policy records.

Examples of data structures will now be discussed for further illustrative purposes. Three exemplary data structures correspond to lien records, VDRM request records, and VDRM package data records. For instance, a lien record can include identification data uniquely identifying a venue, artist, or other rights holders, a unique ID identifying the particular event, a camera or other device capture ID, a unique identifier associated with a photographer or device operator, such as a ticket or seat number, the date and time the camera was configured to operate in a protective mode, such as when the camera entered the venue, and the end date and time of the event.

Alternatively, events may have portions during which content is subject to DRM protection and portions during which the content is not subject to DRM protection. For instance, if photography is generally allowable except during a certain part of a performance, the part of the performance will be noted by time interval data indicating when the protected part begins and when the protected part ends. For instance, for devices which may be switched between a protected and unprotected mode, the devices may be switched into protected mode by a wireless signal corresponding to the time that content is to be protected. Alternatively, a venue may have areas where photography is permitted without restriction, such as in concourses, hallways, and generally outside the range of protected content, while photography within the range of the protected content is to be protected. A distance-dependent wireless signal could be used so that devices entering within a certain radius of the protection content are switched into protected mode. DRM lien records may include data indicating one or more time intervals during which devices were switched into protected mode.

In one data structure embodiment, a request record may include data specifying a device ID, the starting date and time for content capture, and the ending date and time of content capture. The request may further include an identifier of the computer used to make the request, as well as any additional data required by the DRM architecture.

In an exemplary DRM package data record, any data required to implement a particular DRM architecture, such as a license server URL, private DRM encryption key, venue and artist information, starting date and times and ending date and times may be included.

FIG. 14 shows three exemplary matching lien records 804A, 804B, and 804C which are returned. Continuing the example from above, the lien records may correspond to the three video files, which may, for instance, be covered by three different policies (as could be the case, for example, if three different acts performed in succession at a concert). At step 806, the lien records are sorted chronologically. At step 808, the lien records are examined to determine if any timeframes overlap between the liens. If so, at step 810, the lien dates and times and harmonized with one another. For example, consecutive liens may be offset by one second from one another to resolve any overlap. Other rules for resolving collisions between liens may be defined. At step 812, rights policy records are assembled based on data included with the liens, such as date specified DRM implementation to be used with the content, and information to be returned for use by the downloading application in decrypting the content.

EXAMPLE

The following scenario is set forth for purposes of illustration and example only. In this scenario, a concert event is planned, with opening act performer $P_1$ and main act performer $P_2$ performing in succession at venue V, a large arena. Further assume that among the concert attendees are two users $U_1$ and $U_2$.

As part of the concert arrangements, $P_1$ and $P_2$ arrange for the use of venue V. As part of the arrangement, the performers contract with a Venue DRM compliance provider CP. In this scenario, the VDRM compliance provider CP maintains a DRM policy server and also makes appropriate arrangements with DRM implementation providers. For instance, assume P1 specifies that his content is to be rendered in the FairPlay (Apple iTunes) format, while $P_2$ specifies his content is to be rendered in the Windows Media DRM format. Compliance provider CP may add two events to a venue event database, Event01 corresponding to $P_1$'s performance, and Event02 corresponding to $P_2$'s performance. CP may also store the performers' respective preferred DRM implementations and associate them with the event identifiers.

Users $U_1$ and $U_2$ may both obtain tickets to the event, either from the venue directly or via a ticketing management authority. Compliance provider CP may work with the ticketing authority to coordinate ticketing data, or may handle the ticketing. For example, during the ticketing process, assume both $U_1$ and $U_2$ indicate that they wish to bring their respective capture devices $C_1$ and $C_2$ to the concert. For this example, assume $U_1$ wishes to bring digital still camera $C_1$, while $U_2$ wishes to bring a video-capable cellular phone. The ticketing authority's web site may direct the users to a site maintained by CP for pre-registering devices.

As part of the registration process, $U_1$'s camera is plugged into an IP appliance (or directly into his PC). The pre-registration server accesses the camera's unique ID, and then consults a manufacturer's database to obtain a read-enable PIN and device-specific PIN. Using such PINs, the pre-registration server may access C, to ensure that the firmware is up-to-date and the time is within an acceptable tolerance. Assuming all is well, $C_1$'s unique ID is provided to the ticketing authority to be included with $U_1$'s ticket. The unique ID is also stored by CP and associated with both Event01 and Event02.

Assume $U_2$ is at a public internet terminal, and thus has no access to an IP appliance or other connection for the pre-registration process to access $C_2$. Furthermore, assume that $U_2$ is indoors, and therefore cannot take advantage of $C_2$'s cellular connectivity (or assume that CP does not support pre-registration via direct connection to devices). In any event, pre-registration for $C_2$ fails, and $U_2$ obtains a "plain" ticket.

$U_1$ and $U_2$ then proceed to venue V to attend the concert. Both proceed to a checkpoint for attendees who wish to bring digital capture devices into the performance. $U_1$, who has pre-registered, provides $C_1$ for verification. Personnel of venue V or compliance provider CP access $C_1$ through, for example, $C_1$'s 802.11(b) capability, and verify that the device ID matches $U_1$'s ticket and that the device time and configuration are still in compliance. For example, if a firmware update has issued between $U_1$'s ticket purchase and his attendance at the event, he may be sent to manual arbitration and required to obtain the firmware update before entrance.

$U_2$, since he has not pre-registered, must complete the pre-registration process at venue V. Assume that, fortunately for $U_2$, the registration terminal and his cameraphone $C_2$ both have Bluetooth capability, and so he is able to register $C_2$. Furthermore, $C_2$ is up-to-date and within date tolerances. $U_1$ and $U_2$ enter the venue. CP updates stored data associated with the device IDs for $C_1$ and $C_2$ to note that $C_1$ and $C_2$ entered the venue.

Assume that $P_1$'s performance begins on time. During the performance, $U_1$ takes pictures of $P_1$, while $U_2$ obtains video portions of the act. In both cases, the respective devices each encrypt content as it is captured and store the encrypted content on the devices. CP notes the start and end times of the performance for Event01. The devices may be configured to encrypt all content. Alternatively, the devices may be switchable from a non-protected mode, during which content is not encrypted, and a protected mode, during which the device encrypts all content that is captured. For instance, as part of the entry process, the devices may have been switched into protected mode, if they did not operate continuously in protected mode.

After the performance, CP may generate DRM liens for each of the devices that entered venue V. For instance, each lien will specify a device ID and the time of performance; the lien may specify IDs and simply Event01, with an event database accessible to provide the times. If devices are to be switched in and out of protected mode during the performance, the times of each event may be noted without further detail in the lien records, since any content captured during "unprotected" time will be stored in an unencrypted format. However, for this scenario, assume that the devices continuously operate in protected mode. Therefore, CP maintains a record indicating time intervals during which content from Event01 and Event02 will be protected. In this example, the time intervals coincide with the start and end times of Event01 and Event02, but may be more varied (i.e. more or less protection during certain portions of each performance).

Assume further that there is a significant gap between $P_1$ and $P_2$'s performance, since $P_2$ was late arriving at venue V due to traffic. During the break, $U_1$ and $U_2$ take pictures and video of each other with their friends at the arena while waiting. Finally, during $P_2$'s performance, both users capture stills and videos of $P_2$. CP notes the actual, not the planned, start time of $P_2$'s act for Event02. DRM liens are again generated and associated with device IDs and data defining Event02.

Assume, for this example, that venue V has another event planned for that evening, and so CP does not perform a post-performance security check. $U_1$ and $U_2$ go to their respective homes. $U_1$ connects $C_1$ to a PC to access the still photos from the concert. The encrypted files are downloaded to the PC, for example, under the supervision of a manufacturer-provided download application that includes DRM acquisition software. The DRM acquisition software reads the tags associated with each file, including the device ID tag and the time each photo was taken. The acquisition software sends a request for each encrypted file to determine whether any DRM liens are in effect for the files. One or more DRM servers find a match for the device ID of $C_1$ over the intervals identified with Event01 and Event02. No match is found for the pictures taken between Event01 and Event02 (i.e., during the break). The DRM server indicates to the DRM acquisition software running on $U_1$'s PC that no lien is in effect for the pictures taken during the break. Those pictures are then decrypted and stored in an unprotected format chosen by $U_1$.

Based on the DRM liens for photos taken during Event01 and Event02, the DRM server returns two DRM data package types. For the pictures taken during Event01, the package includes an encryption key and license server information to render each picture in the FairPlay format. $U_1$ will be prompted with the particular terms for those pictures; for instance, that $U_1$ may only view the pictures on up to three different computers. If $U_1$ acknowledges the policy, the acknowledgement is stored in a server maintained by CP. The DRM acquisition software then decrypts the content captured during Event01 and renders it in the FairPlay format. For content captured during Event02, the DRM acquisition software receives a package to render the content in the Windows DRM format.

After the concert, $U_2$ takes advantage of $C_2$'s cellular connectivity by accessing a DRM acquisition software application directly from $C_2$. The DRM acquisition process may proceed in a similar manner as for $C_1$. However, to accommodate the more limited processing capability of $C_2$, for example, the DRM acquisition software may run partially on $C_2$ and partially at a remote server.

Furthermore, the DRM lien for $C_2$ during Event01 and Event02 may differ from that of $C_1$. For instance, both $P_1$ and $P_2$ may be more restrictive regarding video content. This restriction may be implemented by CP based on $C_2$'s unique ID, which may be cross-referenced to a database identifying $C_2$ as a video capture device. If so, the DRM liens for content captured by $C_2$ will specify appropriate data to be included in the DRM packages for the content captured by $C_2$.

For example, video content captured during Event01 and Event02 may be restricted to playback on $C_2$ only by appropriate settings in the Fairplay and Windows DRM formats, respectively. The content captured during the break, however, may be freely transferable. Furthermore, if $U_2$ used $C_2$ to obtain both still and video images, the still images may be subject to the same restrictions as for $C_1$ (i.e. the stills may be encoded such that they can be transferred to up to 3 devices, for example).

Therefore, the DRM acquisition software will render the stills and video captured during Event01 and Event02 in the Windows DRM format, and the video during the break in an unprotected format (e.g. MPEG). $U_2$ may then send the unprotected video to friends, view the protected video on his device only, and view the still photos on up to 3 devices, but may not successfully view a transferred copy of the video or transferred copies of the still photos on any more than three devices.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A non-transitory computer-readable medium comprising a computer executable software product for use in a digital rights management (DRM) compliance system that when executed, directs a computing device to:
   access content and metadata associated with the content;
   determine, based on the metadata, a unique identifier associated with the device that captured the content and capture time data, the capture time data indicating when the content was captured by a capture device;
   query a rights management database using the unique identifier and capture time data;
   receive DRM policy implementation data associated with the captured content;
   decrypt the content; and
   convert the content to a DRM-compatible form based on the DRM policy implementation data.

2. The computer software product as set forth in claim 1, further comprising instructions including code to direct a computing system to present a human-readable DRM policy, based on the DRM policy implementation data, prior to decrypting the content.

3. The computer software product as set forth in claim 1, wherein the computer-readable code is further configured to direct a computing device to prompt an acknowledgement of the DRM policy.

4. The computer software product as set forth in claim 1, wherein the computer software product is adapted to operate on a computer interfaced to the capture device.

* * * * *